(12) United States Patent
Mun (10) Patent No.: US 8,733,738 B2
(45) Date of Patent: May 27, 2014

(54) UNIVERSAL PLATFORM AND AIRCRAFT ASSEMBLY METHOD USING THE SAME

(75) Inventor: Jae Eop Mun, Sacheon-si (KR)

(73) Assignee: Korea Aerospace Industries, Ltd., Sacheon-si, Gyeongsangnam-do (KR)

( * ) Notice: Subject to any disclaimer, the term of this patent is extended or adjusted under 35 U.S.C. 154(b) by 145 days.

(21) Appl. No.: 13/265,492

(22) PCT Filed: Mar. 26, 2010

(86) PCT No.: PCT/KR2010/001872
§ 371 (c)(1),
(2), (4) Date: Oct. 20, 2011

(87) PCT Pub. No.: WO2010/126228
PCT Pub. Date: Nov. 4, 2010

(65) Prior Publication Data
US 2012/0036700 A1 Feb. 16, 2012

(30) Foreign Application Priority Data
Apr. 30, 2009 (KR) .................. 10 2009 003 8290

(51) Int. Cl.
*B66F 3/36* (2006.01)
(52) U.S. Cl.
USPC .................................. 254/122; 254/134
(58) Field of Classification Search
USPC ................... 254/122, 123–128, 134
See application file for complete search history.

(56) References Cited

U.S. PATENT DOCUMENTS

| | | | | |
|---|---|---|---|---|
| 4,901,980 A * | 2/1990 | Hansen | ........................ | 254/9 C |
| 4,945,488 A | 7/1990 | Carver et al. | | |
| 5,012,879 A * | 5/1991 | Bienek et al. | ................. | 180/6.48 |
| 5,363,940 A * | 11/1994 | Fahrion | ........................ | 182/62.5 |
| 5,375,283 A | 12/1994 | Silberman | | |
| 6,059,263 A * | 5/2000 | Otema et al. | ................. | 254/89 H |
| 6,134,734 A * | 10/2000 | Marrero | ........................ | 15/53.1 |
| 6,974,123 B2 * | 12/2005 | Latvys | ........................ | 254/122 |
| 2005/0153818 A1 | 7/2005 | Hazlehurst et al. | | |
| 2010/0243973 A1* | 9/2010 | Deuring et al. | ................. | 254/122 |
| 2012/0036700 A1* | 2/2012 | Mun | ........................ | 29/428 |

FOREIGN PATENT DOCUMENTS

| | | |
|---|---|---|
| JP | 64-064740 | 3/1989 |
| JP | 1-120496 | 8/1989 |
| JP | 07-132898 | 5/1995 |
| JP | 08-127398 | 5/1996 |
| JP | 2002-167054 | 6/2002 |
| JP | 2009-73486 | 4/2009 |

* cited by examiner

Primary Examiner — Lee D Wilson
(74) Attorney, Agent, or Firm — Sherr & Jiang, PLLC (57) ABSTRACT

Disclosed herein are a universal platform and an assembly method of an aircraft using the same. The universal platform includes a plurality of scissor lifts arranged around an aircraft, wherein each of the plural scissor lifts includes a base frame, a support frame located above the base frame, a support table fixedly coupled to an upper portion of the support frame, a plurality of link members axially assembled to be mutually pivoted between the support frame and the base frame, a plurality of hydraulic cylinders coupled to the respective link members and the base frame so as to lift the support frame in upward and downward directions, and a slide member slidably coupled to the support table, and the slide member slides from the support table toward the aircraft so as to allow a worker to work according to height, and there is provided the assembly method of the aircraft using the universal platform, thereby contributing to improvement in productivity and in health of workers.

6 Claims, 8 Drawing Sheets

UNIVERSAL PLATFORM AND AIRCRAFT ASSEMBLY METHOD USING THE SAME

CROSS REFERENCE TO PRIOR APPLICATIONS

This application is a National Stage Patent Application of PCT International Patent Application No. PCT/KR2010/001872 (filed on Mar. 26, 2010) under 35 U.S.C. §371, which claims priority to Korean Patent Application No. 10-2009-0038290 (filed on Apr. 30, 2009), which are all hereby incorporated by reference in their entirety.

TECHNICAL FIELD

The present invention relates to a universal platform and a method of assembling an aircraft using the same, and more particularly to a universal platform capable of adjusting height and changing a shape according to a model of aircraft, and a method of assembling the aircraft using the same.

BACKGROUND ART

In a general assembly process of an aircraft fuselage, a platform is installed on the ground, and then the process is performed on the platform.

Figure 1:
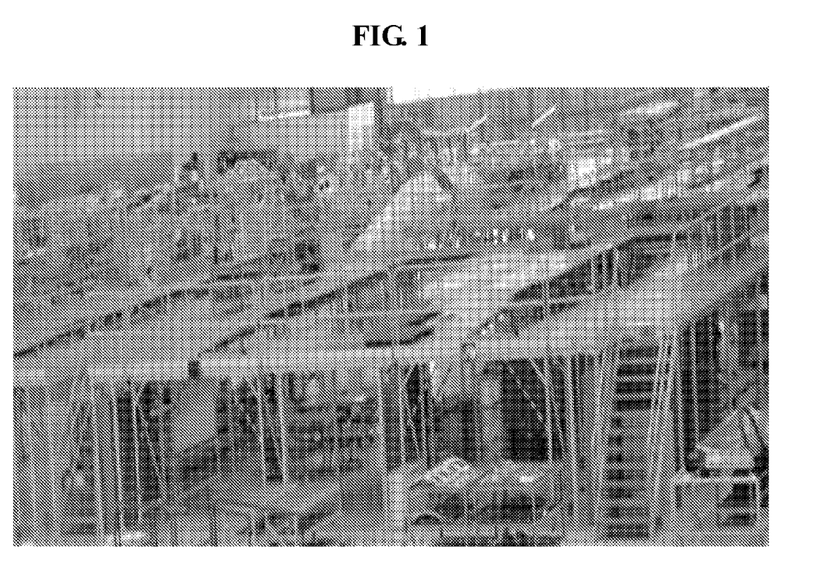
FIG. 1 is a view illustrating a conventional platform.

FIG. 1 is a view illustrating a conventional platform.

As shown in FIG. 1, since the conventional platform is manufactured in an integral fixed type on a per aircraft basis, mounting of wings or horizontal tails is difficult. Consequently, it may be impossible to incorporate the same with a following process.

Also, since the conventional platform is individually manufactured on a per aircraft basis, a new platform must be manufactured after removing the established platform whenever a model of or a partial shape of the aircraft is changed. Therefore, there is a problem in that excessive costs and time are spent.

Furthermore, there is a danger in that accidents occur due to movement of the aircraft fuselage with a crane even when mounting of a landing system has been completed after assembly of the aircraft fuselage.

In addition, since it is impossible for the conventional platform to adjust height according to a working position, there are problems in that work efficiency is deteriorated, and musculoskeletal diseases occur in workers.

DISCLOSURE

Technical Problem

Therefore, the present invention has been made in view of the above problems, and it is an object of the present invention to provide a universal platform capable of adjusting height to be suitable for a worker's condition.

It is another object of the present invention to provide a universal platform capable of being immediately used simply by replacement of a partial part although a model of aircraft is changed.

It is another object of the present invention to provide a universal platform capable of achieving an enhancement in space utilization efficiency.

It is a further object of the present invention to provide an assembly method of an aircraft capable of being incorporated with a following process.

Technical Solution (1) In a universal platform in accordance with a first aspect of the present invention, the universal platform includes a plurality of scissor lifts arranged around an aircraft, wherein each of the plural scissor lifts includes a base frame, a support frame located above the base frame, a support table fixedly coupled to an upper portion of the support frame, a plurality of link members axially assembled to be mutually pivoted between the support frame and the base frame, a plurality of hydraulic cylinders coupled to the respective link members and the base frame so as to lift the support frame in upward and downward directions, and a slide member slidably coupled to the support table, and the slide member slides from the support table toward the aircraft so as to allow a worker to work according to height.

(2) In a second aspect of the present invention according to the universal platform of the first aspect (1), the slide member may slide by a pneumatic cylinder mounted at a lower surface of the support table.

(3) In a third aspect of the present invention according to the universal platform of the first aspect (1), the slide member may be able to be replaced when a model of aircraft is changed.

(4) In a fourth aspect of the present invention according to the universal platform of the first aspect (1), the slide member may have, at an end thereof, a shape matching an outer surface of the aircraft.

(5) In a fifth aspect of the present invention according to the universal platform of the first aspect (1), the support table may be further provided with a folder member bent upwards.

(6) In a sixth aspect of the present invention according to the universal platform of the fifth aspect (5), the folder member may be actuated by a hydraulic cylinder mounted at a lower surface of the support table.

(7) In a seventh aspect of the present invention according to the universal platform of the fifth aspect (5), the folder member may be able to be replaced when a model of aircraft is changed.

(8) In an eighth aspect of the present invention according to the universal platform of the first aspect (1), the support table may be pivotably coupled, at one side thereof, with an upper end of a staircase structure.

(9) In a ninth aspect of the present invention according to the universal platform of the eighth aspect (8), the staircase structure may be provided, at a lower end thereof, with a plurality of wheels.

(10) In an assembly method of an aircraft using the universal platform according to any one of the first aspect (1) to the ninth aspect (9) of the present invention, the assembly method includes moving the aircraft to one side of the universal platform using an overhead crane, dropping an entirety of the universal platform so as to prevent damage to the aircraft, mounting the aircraft at lift jacks, lifting the universal platform to a working position, closely attaching the slide member to the aircraft by actuating the pneumatic cylinder, upwardly erecting the folder member by actuating the hydraulic cylinder, mounting main wings and landing gears to the aircraft, dropping the universal platform, moving the aircraft using the landing gears to the other side of the universal platform in which a following process is executed, closely attaching the slide member to the aircraft, mounting flaps and horizontal tails to complete the aircraft, and moving the aircraft after spacing the universal platform apart from the aircraft, wherein a series of processes of the assembly method are continuously performed.

Advantageous Effects

The present invention has an effect of enabling an enhancement in work efficiency through usage of a scissor lift which may adjust height.

Also, the present invention has an effect of reducing costs and time required to remove and reinstall the conventional platform by manufacturing a platform in a separated type.

Furthermore, the present invention has an effect of being adapted to various models of aircrafts, thereby accomplishing increased flexibility of and simplification of production.

In addition, the present invention has an effect of improving safety and health of workers.

Also, the present invention has an effect of facilitating movement of an aircraft to a following process, thereby preventing accidents of an aircraft.

DESCRIPTION OF DRAWINGS

The above and other objects, features and other advantages of the present invention will be more clearly understood from the following detailed description taken in conjunction with the accompanying drawings, in which.

BEST MODE

Hereinafter, exemplary embodiments of the present invention will be described in more detail with reference to the accompanying drawings so as to be easily realized by those skilled in the art. The present invention may, however, be embodied in different forms and should not be constructed as limited to the embodiments set forth herein.

First, a universal platform according to an exemplary embodiment of the present invention will be described in detail.

Figure 2:
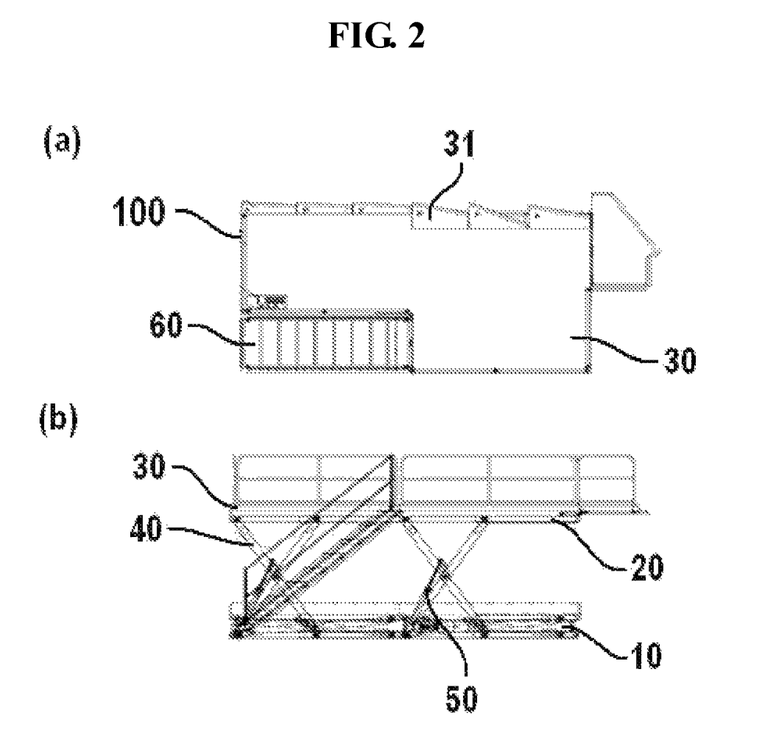
FIG. 2 is a top view and a side view illustrating one scissor lift according to an exemplary embodiment of the present invention.
Figure 3:
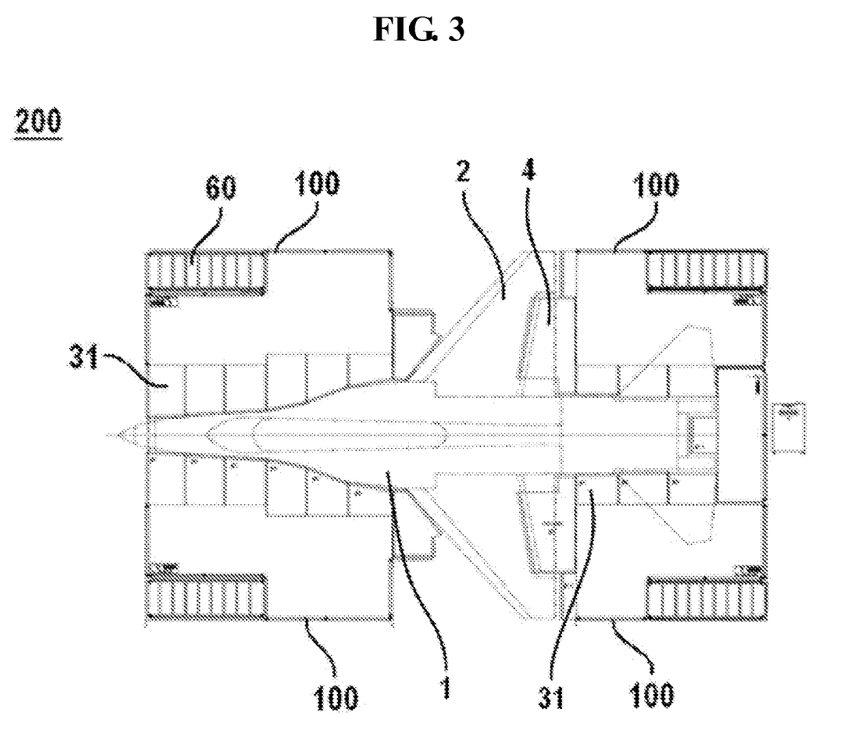
FIG. 3 is a view illustrating an installation appearance of a universal platform according to the exemplary embodiment of the present invention.

FIGS. 2(a) and 2(b) are a top view and a side view illustrating one scissor lift according to the exemplary embodiment of the present invention, respectively. FIG. 3 is a view illustrating an installation appearance of the universal platform according to the exemplary embodiment of the present invention.

As shown in FIG. 2, the universal platform, which is designated by reference numeral 200, according to the exemplary embodiment of the present invention utilizes scissor lifts 100.

Each of the scissor lifts 100 is arranged around an aircraft 1 and serves to safely lift workers, tools, and the like to a working position. The scissor lift 100 basically includes a base frame 10, a support frame 20 located above the base frame 10, a support table 30 fixedly coupled to an upper portion of the support frame 20, a plurality of link members 40 axially assembled to be mutually pivoted between the support frame 20 and the base frame 10, and a plurality of hydraulic cylinders 50 coupled to the respective link members 40 and the base frame 10 so as to lift the support frame 20 in upward and downward directions.

In the universal platform 200 according to the embodiment of the present invention, each of the scissor lifts 100 further includes a slide member 31.

Specifically, the support table 30 is fastened, at a lower surface thereof, with a guide unit such as a guide member (not shown). The slide member 31 is slidably coupled between the support table 30 and the guide unit.

The slide member 31 slides toward the aircraft 1, thereby filling a space between the aircraft 1 and the corresponding scissor lift 100. Thus, it may be possible to prevent workers, tools, and the like from dropping during assembly of the aircraft 1.

In this case, the slide member 31 may be configured as one or more slide members depending on the model of aircraft, and also be deformed in various manners.

As shown in FIG. 3, the universal platform 200 according to the embodiment of the present invention prepares a plurality of scissor lifts 100 and is installed in such a manner that the plural scissor lifts 100 are arranged around the aircraft 1.

In more detail, the scissor lifts 100 are respectively arranged at left and right sides of the respective front and rear of the aircraft 1, and then the slide member 31 of each scissor lift 100 is closely attached to the aircraft 1. As a result, a working space of a worker may be obtained.

In this case, the support table 30 is formed, at a lower surface thereof, with a pneumatic cylinder (not shown) in order to automatically slide the slide member 31.

Furthermore, the slide member 31 preferably has, at end thereof, a streamlined or linear shape matching an outer surface of the aircraft 1 in order to minimize an empty space between the aircraft 1 and the support table 30.

The support table 30 is further provided with a folder member 32 formed to be bent upwards if necessary, in addition to the slide member 31.

Such a folder member 32 may be actuated by a hydraulic cylinder (not shown) mounted at the lower surface of the support table 30, similar to the slide member 31.

When a different model of aircraft is to be assembled, the slide member 31 and the folder member 32 may be replaced with members of any other suitable shape for the changed model of aircraft.

In the universal platform 200 according to the embodiment of the present invention, the support table 30 may be provided, at one side thereof, with a staircase structure 60.

Preferably, the staircase structure 60 is pivotably fastened, only at an upper end thereof, to one side of the support table 30 while being formed, at a lower end thereof, with a plurality of wheels so as to enable upward and downward movement of and smooth height adjustment of the support table 30 at the same time.

The configurations of the scissor lifts and the universal platform according to the exemplary embodiment of the present invention have been described above. In accordance with the exemplary embodiment of the present invention, the aircraft may be more safely assembled using the universal platform. Hereinafter, an assembly method of the aircraft using the universal platform will be described in detail with reference to the accompanying drawings.

Figure 4:
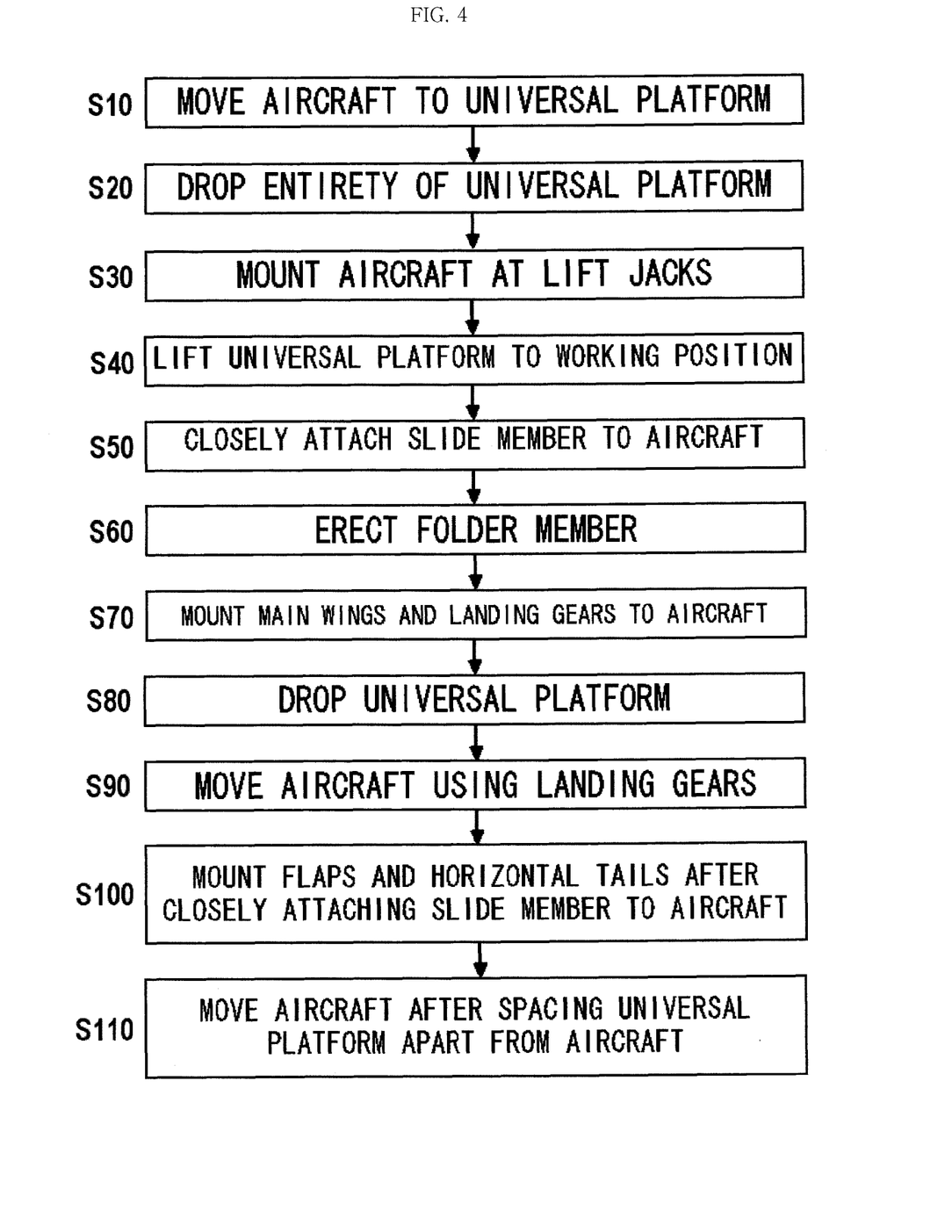
FIG. 4 is a process chart illustrating an assembly method of an aircraft using the universal platform according to the exemplary embodiment of the present invention.

FIG. 4 is a process chart illustrating the assembly method of the aircraft using the universal platform according to the exemplary embodiment of the present invention. FIGS. 5 to 11 are views illustrating the assembly method of the aircraft using the universal platform according to the exemplary embodiment of the present invention, respectively.

As shown in FIG. 4, the assembly method of the aircraft using the universal platform according to the exemplary embodiment of the present invention includes the steps of moving the aircraft to the universal platform (S10), dropping the entirety of the universal platform (S20), mounting the aircraft at lift jacks (S30), lifting the universal platform to the working position (S40), closely attaching the slide member to the aircraft (S50), erecting the folder member (S60), mounting main wings and landing gears to the aircraft (S70), dropping the universal platform (S80), moving the aircraft using the landing gears (S90), mounting flaps and horizontal tails after closely attaching the slide member to the aircraft (S100), and moving the aircraft after spacing the universal platform apart from the aircraft (S110).

Hereinafter, each process of the assembly method will be described in more detail with reference to FIGS. 5 to 11.

Figure 5:
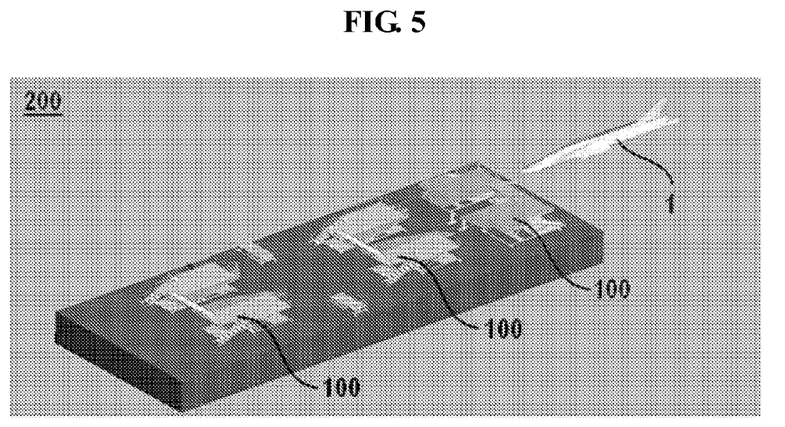
FIGS. 5 to 11 are views illustrating the assembly method of the aircraft using the universal platform according to the exemplary embodiment of the present invention, respectively.

First, as shown in FIG. 5, the aircraft 1 equipped with a body is moved to one side of the universal platform 200 by an overhead crane (not shown).

Figure 6:
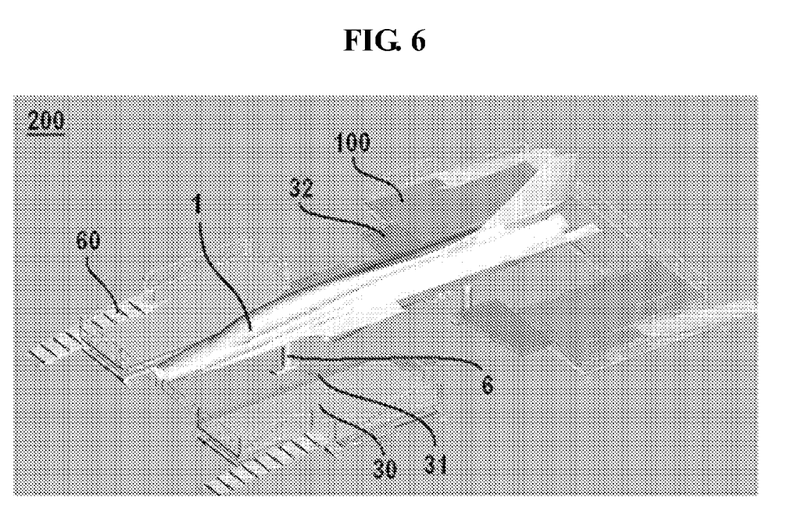

Next, as shown in FIG. 6, the aircraft 1 is mounted at the lift jacks 6 installed on the ground. In this case, the entirety of the universal platform 200 is dropped so as to prevent damage to the aircraft 1.

Figure 7:
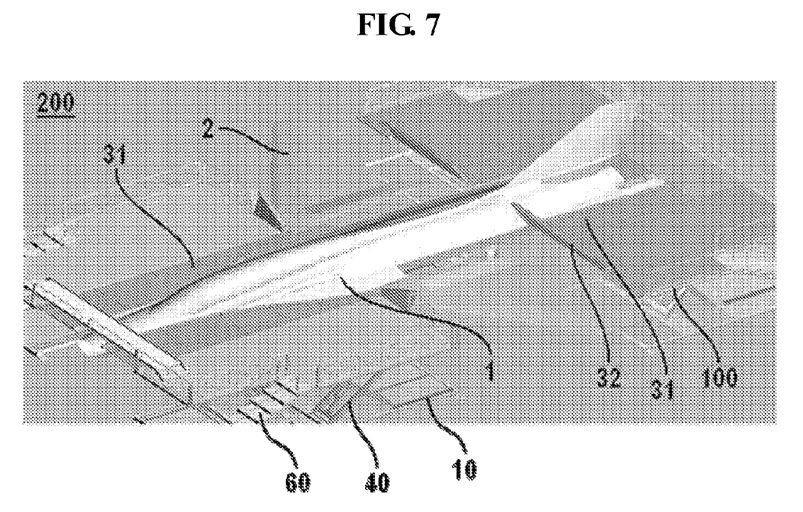

Thereafter, the dropped universal platform 200 is lifted up to the working position so as to mount the main wings 2. Then, the slide member 31 of each scissor lift 100 is closely attached to the body of the aircraft 1 so that a worker approaches the aircraft 1 and smoothly works, and the main wings 2 are mounted after the folder member 32 of each scissor lift 100 is erected upwards, as shown in FIG. 7. In this case, the slide member 31 and the folder member 32 may be automatically controlled by the pneumatic cylinder or the hydraulic cylinder as described above.

Figure 8:
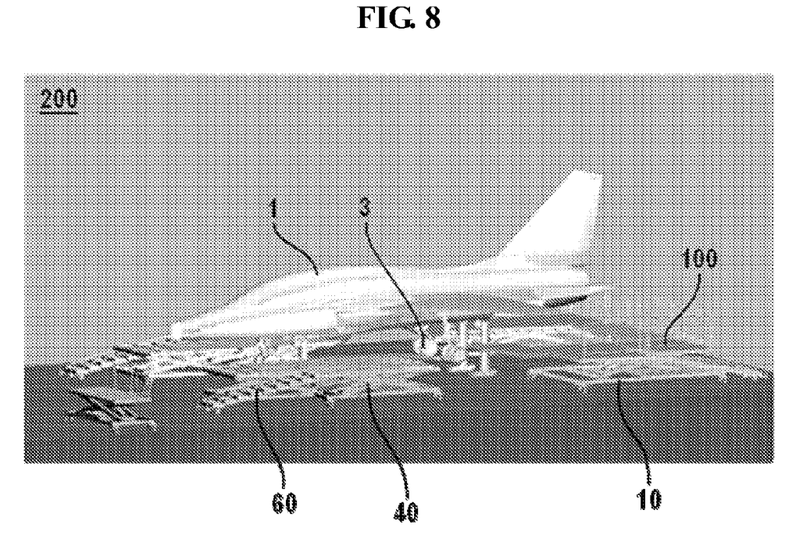
Figure 9:
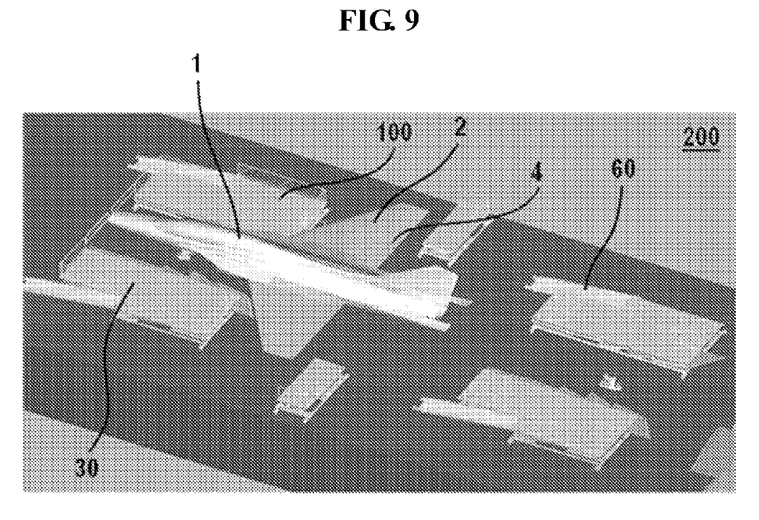

After the working condition as described above is accomplished, the aircraft 1 is mounted with the main wings 2 and the landing gears 3, as shown in FIGS. 7 and 8. When such mounting has been completed, the universal platform 200 is dropped to move the aircraft 1 using the landing gears 3 toward the other side of the universal platform 200 in which a following process is executed, as shown in FIG. 9.

Figure 10:
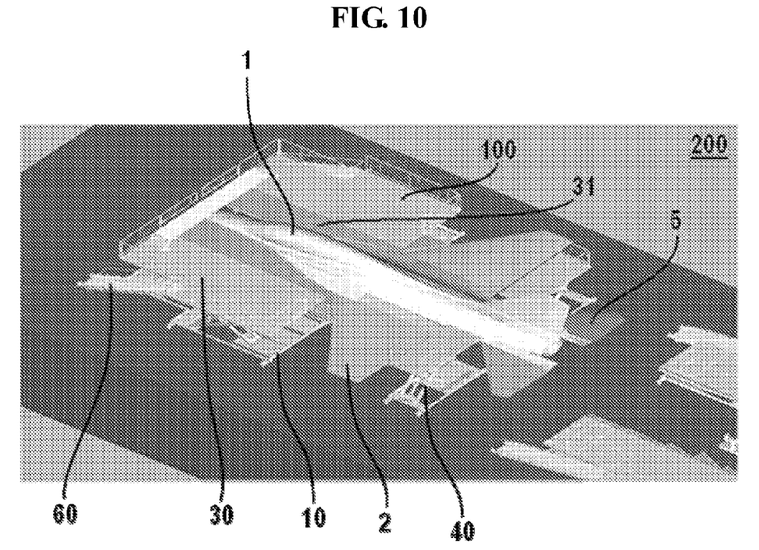

Subsequently, referring to FIGS. 9 and 10, the slide member 31 is closely attached to the aircraft 1 to execute mounting of the flaps 4 and the horizontal tails 5 in the following process.

Figure 11:
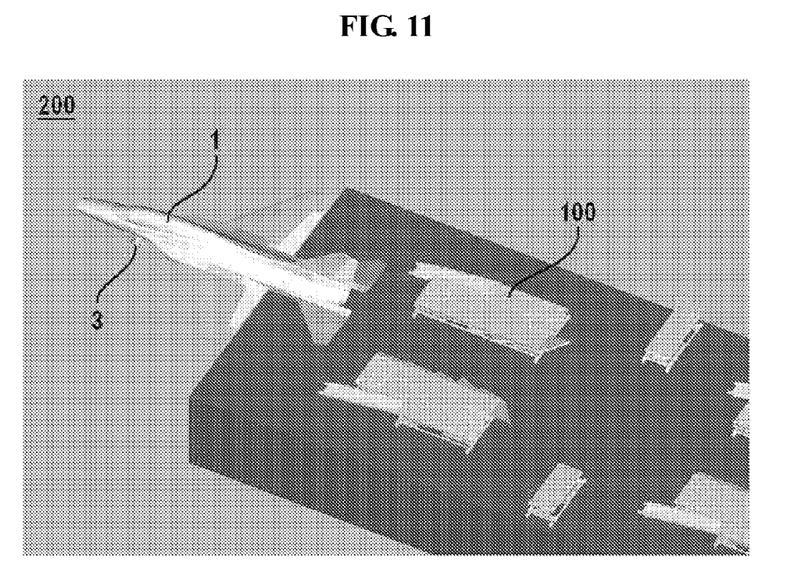

Finally, referring to FIG. 11, when the assembly of the aircraft 1 has been completed, the universal platform 200 is spaced apart from the aircraft 1 by a predetermined distance, and then the aircraft 1 is moved to a test place or a hanger.

Various embodiments have been described in the best mode for carrying out the invention.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

Therefore, it should be understood that the invention is intended to cover not only the exemplary embodiments, but also various alternatives, modifications, equivalents and other embodiments, which may be included within the spirit and scope of the invention as defined by the appended claims.

The invention claimed is:

1. A universal platform comprising:
a plurality of scissor lifts arranged around an aircraft, wherein:
each of the plural scissor lifts comprises a base frame, a support frame located above the base frame, a support table fixedly coupled to an upper portion of the support frame, a plurality of link members axially assembled to be mutually pivoted between the support frame and the base frame, a plurality of hydraulic cylinders coupled to the respective link members and the base frame so as to lift the support frame in upward and downward directions, and a slide member slidably coupled to the support table; and
the slide member slides from the support table toward the aircraft so as to allow a worker to work according to height,
wherein the support table is pivotably coupled, at one side thereof, with an upper end of a staircase structure.

2. The universal platform according to claim 1, wherein the slide member slides by a pneumatic cylinder mounted at a lower surface of the support table.

3. The universal platform according to claim 1, wherein the support table is further provided with a folder member bent upwards.

4. The universal platform according to claim 3, wherein the folder member is actuated by a hydraulic cylinder mounted at a lower surface of the support table.

5. The universal platform according to claim 3, wherein the folder member is able to be replaced when a model of aircraft is changed.

6. The universal platform according to claim 1, wherein the staircase structure is provided, at a lower end thereof, with a plurality of wheels.

* * * * *